Figure 1:
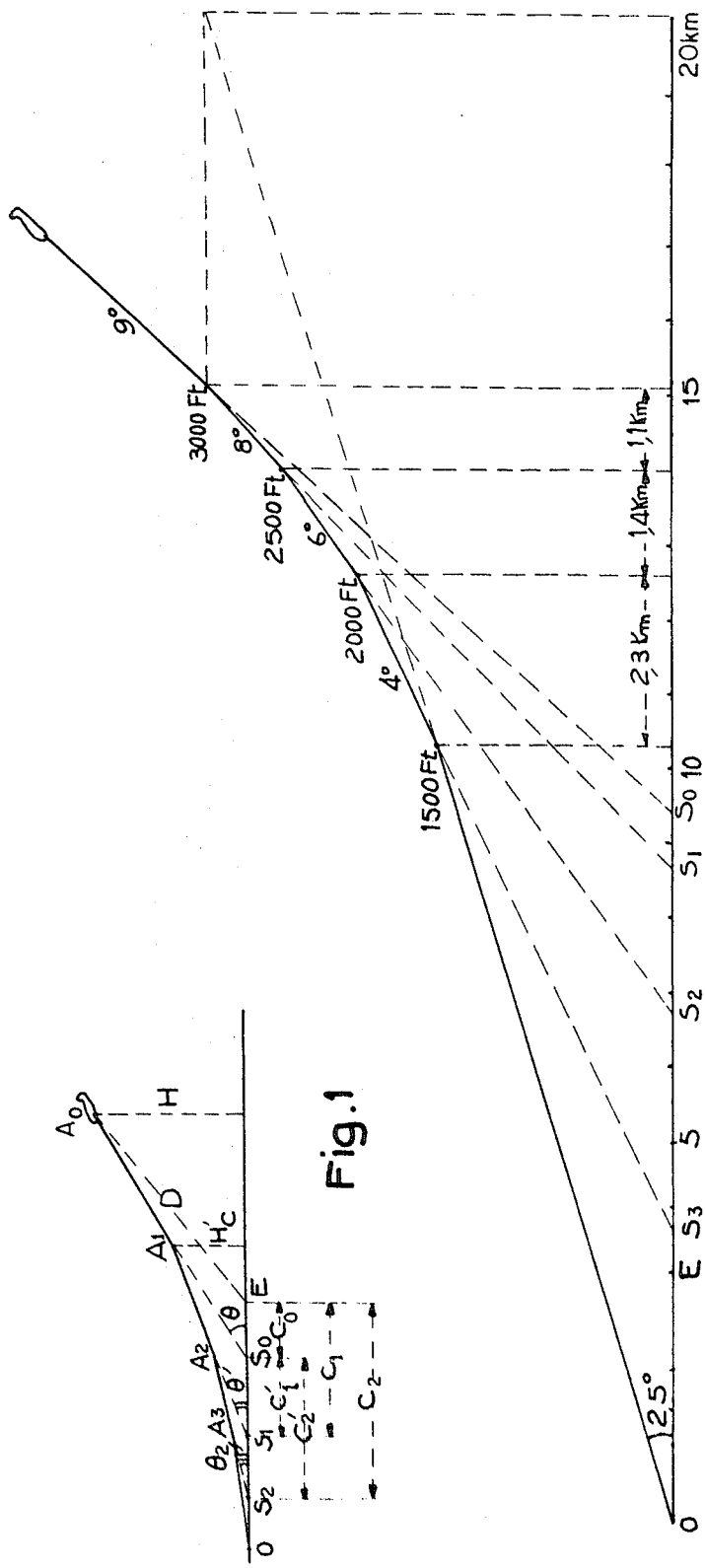

United States Patent

[11] 3,588,477

[72] Inventors Rene Lami;
Georges Colombet, Paris, France
[21] Appl. No. 725,311
[22] Filed Apr. 30, 1968
[45] Patented June 28, 1971
[73] Assignee CSF-Compagnie Generale De Telegraphie Sans Fils
[32] Priority May 3, 1967
[33] France
[31] 105.164

[54] ACTUAL SLOPE COMPUTER
4 Claims, 4 Drawing Figs.
[52] U.S. Cl. .......................................... 235/150.22, 235/150.27, 244/77, 340/25, 343/108
[51] Int. Cl. .......................................... G06f 15/50, G06g 7/70
[50] Field of Search .......................... 235/150.22, 150.26, 150.27; 343/108, 112.1; 244/81, 77, 63; 340/22, 25

[56] References Cited
UNITED STATES PATENTS
| | | | |
|---|---|---|---|
| 2,987,275 | 6/1961 | Yeates et al. | 244/77 |
| 3,149,226 | 9/1964 | Campbell | 235/150.22 |
| 3,182,327 | 5/1965 | Mitchell et al. | 343/108 |
| 3,265,333 | 8/1966 | Montooth | 244/77 |
| 3,280,310 | 10/1966 | Montooth | 235/150.22 |
| 3,392,390 | 7/1968 | Schelisch | 343/112 |
| 3,345,017 | 10/1967 | Olah | 244/77 |

Primary Examiner—Malcolm A. Morrison
Assistant Examiner—Felix D. Gruber
Attorney—Edwin E. Greigg ABSTRACT: An actual slope computing system for indicating, at any moment, on board an aircraft, the deviation between the actual flight path of the aircraft and a preselected nonhorizontal nonlinear path including a first linear preselected path and a last linear preselected path, said system comprising a computing unit for computing at any moment the value of the altitude H necessary for said aircraft to follow a nonhorizontal linear path, as a function of given parameters of said first path; and a memory and logic circuits for feeding to said computing unit, at moments determined as a function of the position of said aircraft, successively the parameters of said first path, of successive programmed linear portions of said preselected path, and of said last path, said programmed linear portions being programmed for insuring a progressive merger of this first path said last path.

3,588,477

1

ACTUAL SLOPE COMPUTER

The present invention relates to systems by means of which the pilot of an aircraft can determine, at any moment, the deviation between the actual flightpath of the aircraft and the selected descent or climbpath, the slope of which, i.e. the angle between the flightpath and the horizontal plane, is indicated in the aircraft. Such a system has been described in the U.S. Pat. No. 3,519,806.

The system described in the above-mentioned copending application comprises a computer designed to calculate the altitude at which the aircraft should be at any instant or the glidepath which it should follow as a function of its actual altitude, this being done on the basis of the preselected flightpath slope value and of the data available on board the aircraft, and a comparator element which at each instant indicates the discrepancy between the preselected altitude and the actual altitude of the aircraft, or between the calculated slope which the airplane actually follows and the preselected slope corresponding to the desired flightpath.

This system enables the pilot to fly a glidepath of predetermined slope during, for example, a first part of the approach phase, and then during the final approach, for example below 1500 ft., to follow the glidepath indicated by the I.L.S.

However, transition from one flightpath to the other may be too abrupt and therefore dangerous, the aircraft reaching the glidepath indicated by the I.L.S. with too great a vertical velocity component this taking place near the ground.

It is an object of the invention to avoid this drawback by achieving a progressive merging of one glidepath into the other.

According to the invention there is provided an actual slope computing device for indicating, at any moment, on board an aircraft, the deviation between the actual flightpath of said aircraft and a preselected nonhorizontal nonliner path, consisting of an initial preselected path and of a plurality of programmed successive linear paths, comprising: a conventional slope computing unit for computing the value of the altitude H necessary for the aircraft to follow a given linear path, as a function of given parameters of said given path and of the distance of the aircraft to a D.M.E. transmitter on the ground, an altimeter, and altitude deviation indicating means coupled to the altimeter and to the computing device; and memory, comparing and selecting means for feeding to said computing UNIT as given parameters successively the parameters of said initial and of said programmed linear paths, at moments determined by the position of the air craft.

In a preferred embodiment of the invention, the slope of the initial linear preselected path may be varied and the parameters of the programmed paths are computed as a function of said slope.

Figure 2:
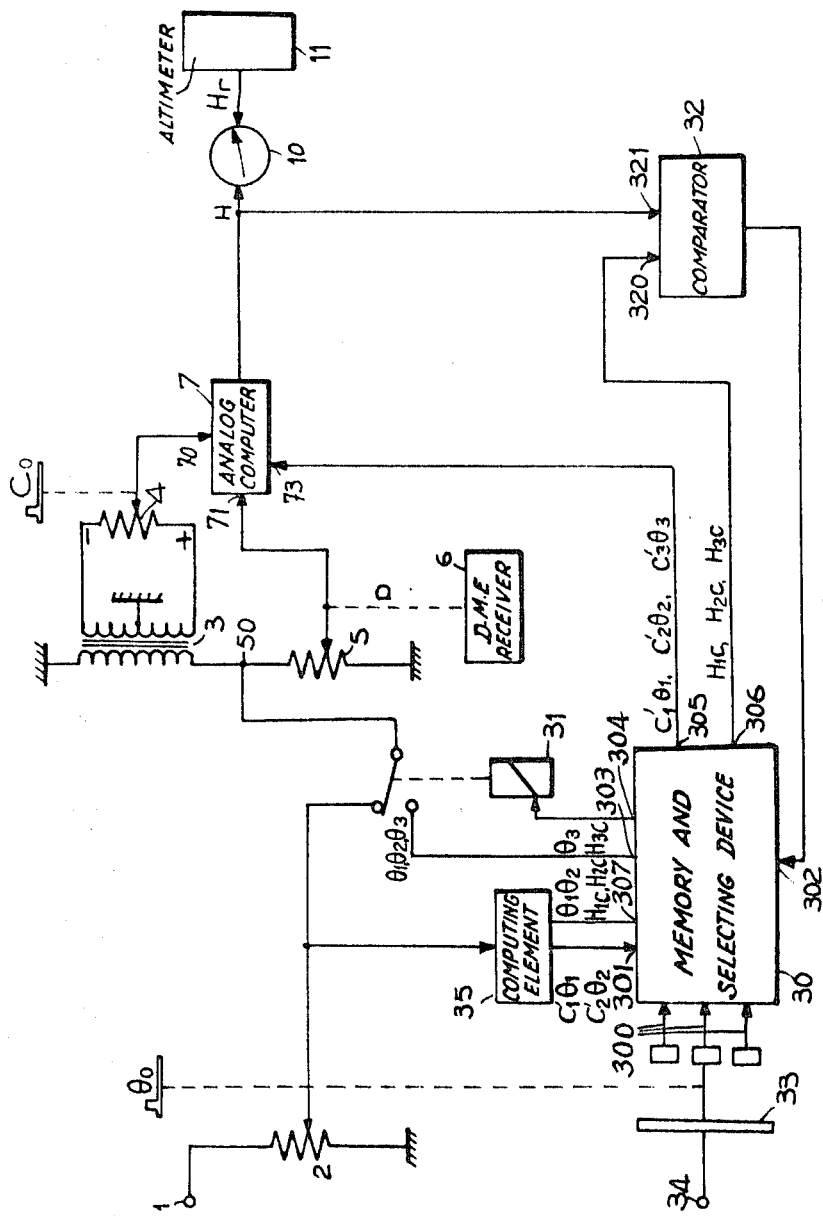
Figure 3:
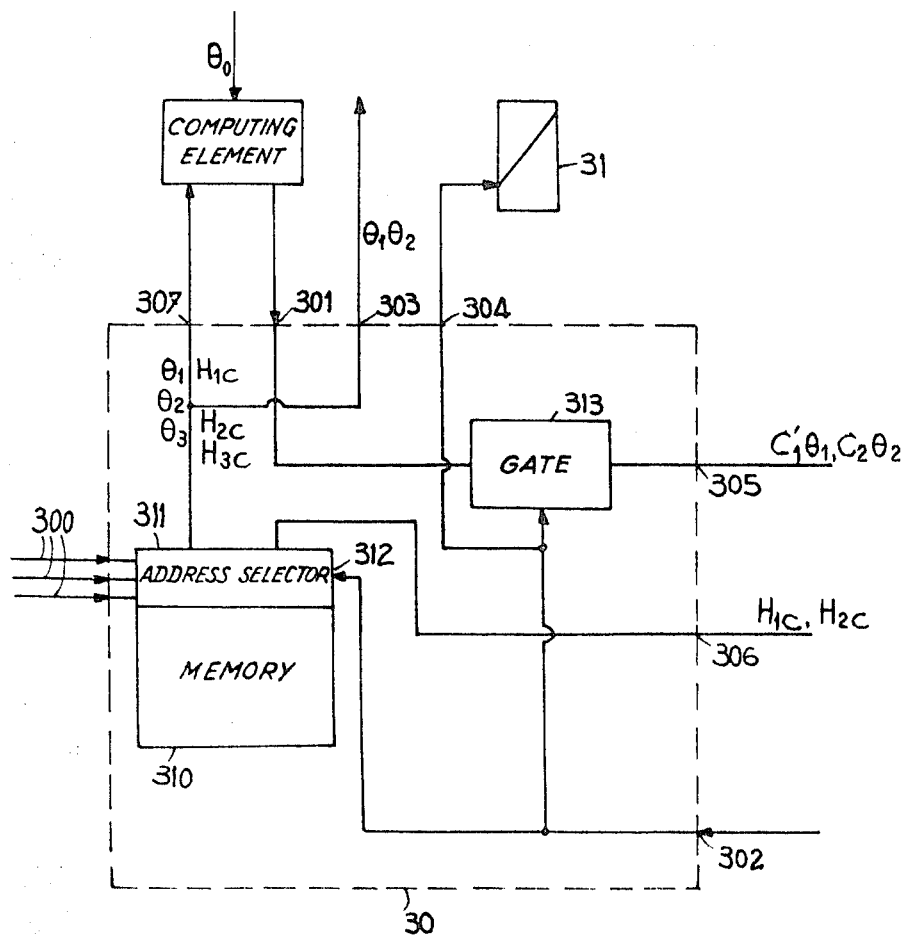

For a better understanding of the invention and to show how the same may be carried into effect, reference will be made to the drawing accompanying the ensuing description and in which:

FIG. 1 is a explanatory diagram;
FIG. 2 shows one embodiment of the invention;
FIG. 3 shows a part of the embodiment of FIG. 2; and
FIG. 4 is an enlarged view of a portion of FIG. 1.

For the sake of clarity, the invention will be described (although this is by no means intended to be a limitation) in the case in which the transmitter E of the D.M.E. system (distance measuring equipment) is located in the vertical plane containing the selected flightpaths. This is one of the cases which have been considered in the above-mentioned copending patent application and which has been called the simple case.

It will also be assumed that the variation in the flightpath takes place in a discontinuous manner although it goes without saying that this variation could be continuous, as will be apparent from the ensuing discussion.

The principle of the way in which the flightpath varies is set forth in FIG. 1. The aircraft at $A_0$, which is at the altitude H, is flying the flightpath AS of slope $\Theta_0$ under the control of the true-slope computer described in the above-mentioned patent, the parameters $\Theta$ and C, an algebraic measure of the distance ES, being set on board the aircraft. It will be recalled that the true-slope computer described in the above-mentioned patent derives from the parameters $\Theta_0$ and $C_0$ the desired altitude H:

$$H \simeq (D+C)\Theta,$$

D being the distance of the aircraft from the D.M.E. transmitter E.

On arrival at point $A_1$, the aircraft leaves the flightpath, which was so far selected, to follow the programmed flightpaths $A_1A_2$ (parameters $\Theta_1$ and $C_1$) and $A_2A_3$ (parameters $\Theta_2$ and $C_2$). The last named flightpath portion intersects the flightpath $A_3 \Theta$ defined by the I.L.S. $\Theta$ representing the start of the runway. Only two programmed flightpaths are shown in FIG. 1, for the sake of clarity, although in fact in accordance with the invention they may be more than two.

FIG. 1 shows that the values $C_0, C_1, C_2$ are to be selected in such a way that each flightpath is above the preceding one, starting from the point at which it is to be used, this in order to avoid any risk of accident. The slope $\Theta_1$ of the first programmed flightpath used to insure the merging of the flightpath with the slope $\Theta_0$ selected by the pilot into the flightpath defined by the I.L.S. should therefore be less than the slope $\Theta_0$. On the other hand, assuming the distance $C_0$ to be fixed, the computer must be supplied with the values $C'_1$ and $C'_2$, such that:

$$C_1 = C'_1 + C_0$$

and $C_2 = C'_2 + C_0$. As to the choice of the instant at which the flight path A.S., selected by the pilot, should be left for the programmed merging flight paths, it will, for obvious reasons of safety, be determined by the aircraft altitude as furnished by the aircraft altimeter or by the computer.

FIG. 2 illustrates an embodiment of the system according to the invention. The system comprises all the elements of the slope computer described in the above-mentioned Patent.

A manually-operated voltage setting arrangement 2 which receives a reference voltage at its terminal 1, supplies at the point 50 a voltage which is the analogue of $\Theta_0$, the slope of the selected flightpath; a transformer 3 supplies through a potentiometer 4 to the input 70 of an analogue adding computer 7 a voltage which is the analogue of $C_0\Theta_2$, $C_0$ being set manually by means of the potentiometer 4; the voltage setting arrangement 5, set as a function of value D supplied by the D.M.E. receiver 6, applies to the input 71 of the adder 7 a voltage which is the analogue of $D \Theta_0$; the computer thus supplies to the indicator 10 the value $H = D \Theta_0 + C\Theta_0$, the indicator 10 also receiving the true altitude signal Hr furnished by the altimeter 11.

According to the present invention there is provided an arrangement of logic circuits and selection circuits 30 which will be described in more detail later. The preselected slope values and the corresponding altitudes are stored in the circuitry 30. A computer 35, and a switching circuit 31 make it possible to substitute for $\Theta$ at the input 50 of the slope computer, one of the preselected slope values available at the output 303 of the circuitry 30. A contactor 33, supplied with a fixed voltage at the terminal 34, is coupled to the setting control 2. It supplies to the circuitry 30, for example through one of the three terminals 300, a voltage which makes it possible for the circuitry 30 to select a range of slope values lower than $\Theta_0$. The circuitry 30 supplies at its output 305, a voltage which is the analogue of $C'_1 \Theta_1$ or $C'_2 \Theta_2$, in accordance with the preselected programmed slope value which is applied to the input 50 of the computer (if the computer receives $\Theta$, i.e. if the point at which the programmed flightpaths have to be followed has not yet been reached, the voltage at the output 305 is zero). The output 305 is connected to an additional input 73, of the adder 7. If the value of the slope $\Theta_0$ is a matter of arbitrary choice (this is the case in FIG. 2), the values of $C'_1 \Theta_1$, $C'_2 \Theta_2$, etc., etc., are supplied to the input 301 of the circuitry 30 by the computer 35, to the inputs of which latter there are applied the quantity $\Theta_0$ of the selected slope, and the requisite programmed values for calculation supplied by the output 307 of the circuitry 30. If the value of the slope $\Theta_0$ is selected in terms of discrete values, the computer element is not used, the values of $C'_1$, $C'_2$...etc., corresponding to each $\Theta_0$ value, being programmed.

The output 306 of the circuitry 30 supplies a voltage which is the analogue of the critical programmed altitudes $H_{1c}$ or $H_{2c}$, at which the change of flightpath takes place ($H_{1c}$ altitude of $A_1$, $H''_c$ altitude of $A''$). A comparator 32 is supplied at its inputs 320 and 321 respectively with the values $H_{1c}$ and H. This comparator supplies a control signal to the control input 302 of the circuitry 30, whenever the two voltages at its inputs are the same.

FIG. 3 shows in more detail the circuitry 30. This assembly comprises a memory 310 in which preselected values $H_{1c}$ and $\Theta_1$, $H_{2c}$ and $\Theta_2$ are stored. An address selector 311 which is controlled by pulses received on its input 312 from the input 302 of the circuitry 30 extracts from the memory 310 the values $H_{1c}$, $\Theta_1$, etc. and passes them to the outputs 303, 307 and 306.

The selector 311 is also controlled by the voltage it receives from one of the outputs 300 so as to inhibit the selection of certain addresses as has been explained above. It can comprise, for example, for each set of recorded values corresponding to a predetermined range of values of $\Theta_0$, an address decoder receiving the pulses of the input 312 and whose only one output, corresponding to the number of pulses received, supplies a signal, as is known, and controls the access to the corresponding memory element. Gate circuits respectively controlled by the outputs of the contactor 33 (such as a rotary switch) switch the pulses of the input 312 on to the decoder corresponding to the selected value of $\Theta_0$ which controls the contactor 33. The input 301 of the circuitry 30 which receives the values $C'_1$ $\Theta_2$ etc. is connected to the output 305 through a gate which, in the same manner as the switch 31, is controlled by a pulse received on its control input from the input 302.

The operation will now be described with particular reference to FIGS. 2 and 3.

The setting system 2 is set at the value $\Theta$ selected by the pilot and from which the slope computer 7 derives the value H so that the plane follows the path $A_0A_1$, the switch 31 being in the position shown in FIG. 2. At this stage the contactor 33 applies to the address selector 311 a voltage which inhibits the selection of a programmed slope value greater than $\Theta$, as explained above, and selects in the memory 310 the address containing the first preselected value following the flight path portion $A_0A$, i.e. the value $\Theta'$ (FIG. 1) corresponding to the flightpath portion $A_0A''$ and the value $H_{1c}$ corresponding to the beginning of that path portion. This latter value is provided at the output 306 and is passed therefrom to the comparator 32. Upon the plane reaching the point $A_1$ and H becoming equal to $H_{1c}$, the comparator 32, which is for example of the AND-gate type, generates a pulse which is applied to the input 302. From the input 302 this pulse is applied to the input 312 of the selector 311, to the switch 31 and to the gate 313.

This pulse triggers the following procedures:

at the input 312, it causes the appearance at the output 303 of the first preselected value $\Theta_1$, at the output 307—the appearance of the value $\Theta_1$ and the corresponding value of $H_{1c}$ and at the output 306 the substitution of $H_{2c}$ for $H_{1c}$;

it switches the circuit 31 for the duration of the program, whereby $\Theta_1$ is substituted at the input 50 for $\Theta$;

at the control input of gate 313, it causes the opening of this gate for the duration of the program, which makes it possible to pass to the output 305 and consequently to the input 73 of the adder the product $C'_1\Theta_1$ calculated by the computer 35 from the values $C'_1$, $\Theta_1$ and $H_{1c}$ according to the relation $$C_1'\theta_1 = H_0'\left(1 - \frac{\theta_1}{\theta}\right)$$

Of course, it will be obvious that this computer 35 comprises, for example, a divider receiving $\Theta_0$ and $\Theta_1$ whose output is connected to an input of a subtractor having an other input receiving a constant voltage analogue of 1. The output of the subtractor is connected to an input of a multiplier having an other input receiving $H_{1c}$.

Thus the slope calculator provides the value $H = D\Theta_1 + C \Theta_1 + C'_1\Theta_1 \approx xD\Theta_1 + C'\Theta_1$, which corresponds to the programmed flight path $A'A''$.

The aircraft then flies the flightpath $A_1S_1$ up to $A_2$, where H becomes equal to $H_{2c}$. The comparator supplies a new signal which brings about the replacement of $\Theta_1$ by $\Theta_2$, of $C'_1\Theta_1$ by $C''_1\theta_2$ and of $H_{2c}$ by $H_{3c}$, and so on, until the point is reached at which the aircraft joins the flightpath determined by the I.L.S.. From this point onwards the indications furnished by the actual-slope computer are replaced by those of the I.L.S.

FIG. 4 gives a numerical example of a flightpath embodying three programmed sections. The values of the angles are highly exaggerated for the sake of clarity. It will be assumed that it is desired to reach the I.L.S. flightpath at a point which is at an altitude of 1500 ft. (about 450m.), at about 10.3 km. away from the end 0 of the runway, the usual value of the slope of this flightpath being about 2.5°. It will be seen that one may use a programme starting at $H'_c = 3000$ ft. (about 910 m.) with programmed slopes of 8, 6 and 4 degrees, the changes in flightpath slope being effected respectively at 2500 ft. (760 m.) and 2000 ft. (610 m.). The flightpath slope selected by the pilot prior to the programme, being 9°, the value of $C_0$ to be set is −6 km. with the transmitter E positioned as indicated in FIG. 1.

If the programmed flightpaths were to start a little further from the entry threshold of the runway, the flightpath determined by the I.L.S. would be reached at an altitude of slightly more than 1500 ft., if using the same programme.

One of the major advantages of the system according to the invention is that, considering this case, the aircraft flies at an altitude of 3000 ft. at only 15 km. from the entry of the runway, whilst with the I.L.S. on its own, the aircraft would have had to be at an altitude of 3000 ft. at 20 km. from the end of the runway.

Of course, the invention is not limited to the embodiment described and shown which was given solely by way of examples.

Thus, if continuous variation in flightpath slope are desired, a servomechanism can produce variable voltages which are analogues of $\Theta_1$ and $C'_1\Theta_1$. This servomechanism is to be controlled as a function of the altitude and the instant of commencement of the flightpath determined by this servomechanism is to be controlled by the set value $\Theta$ corresponding to the selected slope. The law of variation of the voltages which are the analogues of $\Theta_1$ and $C'_1\Theta_1$, as a function of the position of the servomechanism, may be arbitrarily determined in accordance with the flightpath it is desired to follow (for example a curve of constant aircraft loading).

We claim:

1. An actual slope computing system for indicating at any moment on board an aircraft, the deviation between the actual flightpath of said aircraft and a preselected nonhorizontal nonlinear path consisting of an initial linear preselected path of slope $\Theta_0$ and of a plurality of linear programmed successive paths of respective slopes $\Theta_i$ (where $i=1,2...$) said programmed paths starting at respective programmed altitudes Hic, said system comprising in association:

a conventional slope computing device comprising a first computing unit for computing at any moment the value of the altitude H necessary for the aircraft to follow a given linear path, having a first slope input, a second distance input for the distance D between the aircraft and a distance measuring transmitter on the ground, and a third, path characteristic, input for the distance, parallel to the direction of displacement of the aircraft, between said transmitter and the intersection of said given linear path with the ground; an altimeter for supplying at any moment the actual altitude $H_r$ of the aircraft; and indicating means connected to said slope and to said altimeter for displaying, at any moment the deviation between said altitude H and said actual altitude $H_r$;

a memory for said parameters $\Theta_0$, $\Theta_i$, $H_i$ and for parameters $C_o$ and $C_i$, said parameters $C_o$ and $C_i$ being the respective distances between said transmitter and the respective intersections of said preselected path and of said programmed paths with the ground, said memory having a slope output, a parameter D output and a parameter $C_j$ output (where $j=o$ or $i$) coupled respectively to said first second and third input of said computer unit, and a control input for selecting the values respectively applied at said outputs;

a comparator circuit for comparing said computed altitude H and successively said programmed altitude $H_{ic}$ and for generating control pulses; and a selecting circuit having a control input for receiving said pulses and an output coupled to said memory control input.

2. An actual slope computing system as claimed in claim 1 comprising second computing means for computing the parameters $\Theta_i$, $C_i$ and $H_{ic}$ as a function of said slope $\Theta_0$ and of said parameter $C_o$ of said initial preselected slope, said further computing unit having respective inputs for said parameters of said initial path an respective slope, distance, and parameters $C_i$ outputs coupled to said memory.

3. An actual slope computing device as claimed in claim 2 wherein said first computing unit being programmed initially for computing the products $C_o\Theta_i$, said memory supplies a correcting term $C_i\Theta_i$ and said first computer comprises a correction input for said correcting term.

4. An actual slope computing device as claimed in claim 3 wherein said second computing unit comprises a further output for the products $(C_i-C_o)\Theta_i$, coupled to said memory.